June 11, 1968   S. S. STATA   3,387,315
SHOE SCRAPER FLOOR GRATINGS FOR AUTOMOBILE FLOORS
Filed Sept. 15, 1966   2 Sheets-Sheet 1
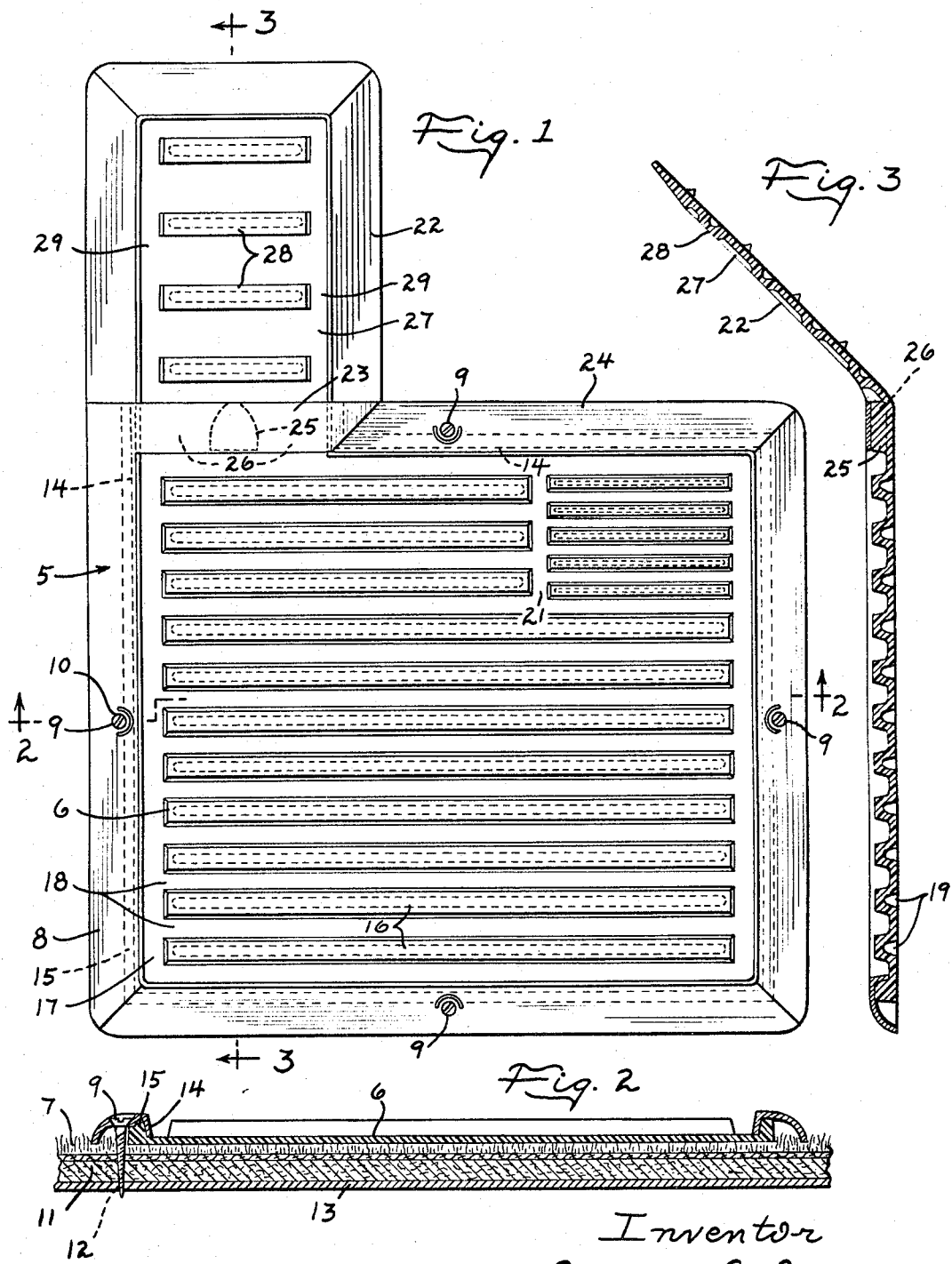
Inventor
Stanley S. Stata
Attorney June 11, 1968 S. S. STATA 3,387,315
SHOE SCRAPER FLOOR GRATINGS FOR AUTOMOBILE FLOORS
Filed Sept. 15, 1966 2 Sheets-Sheet 2
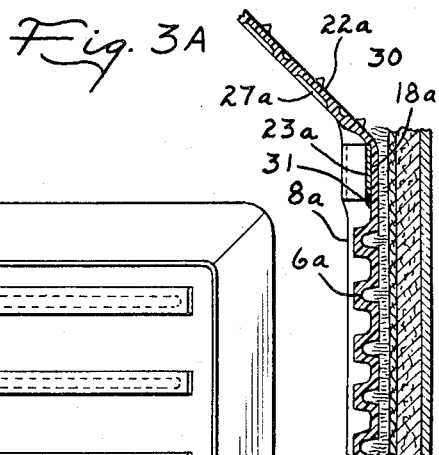
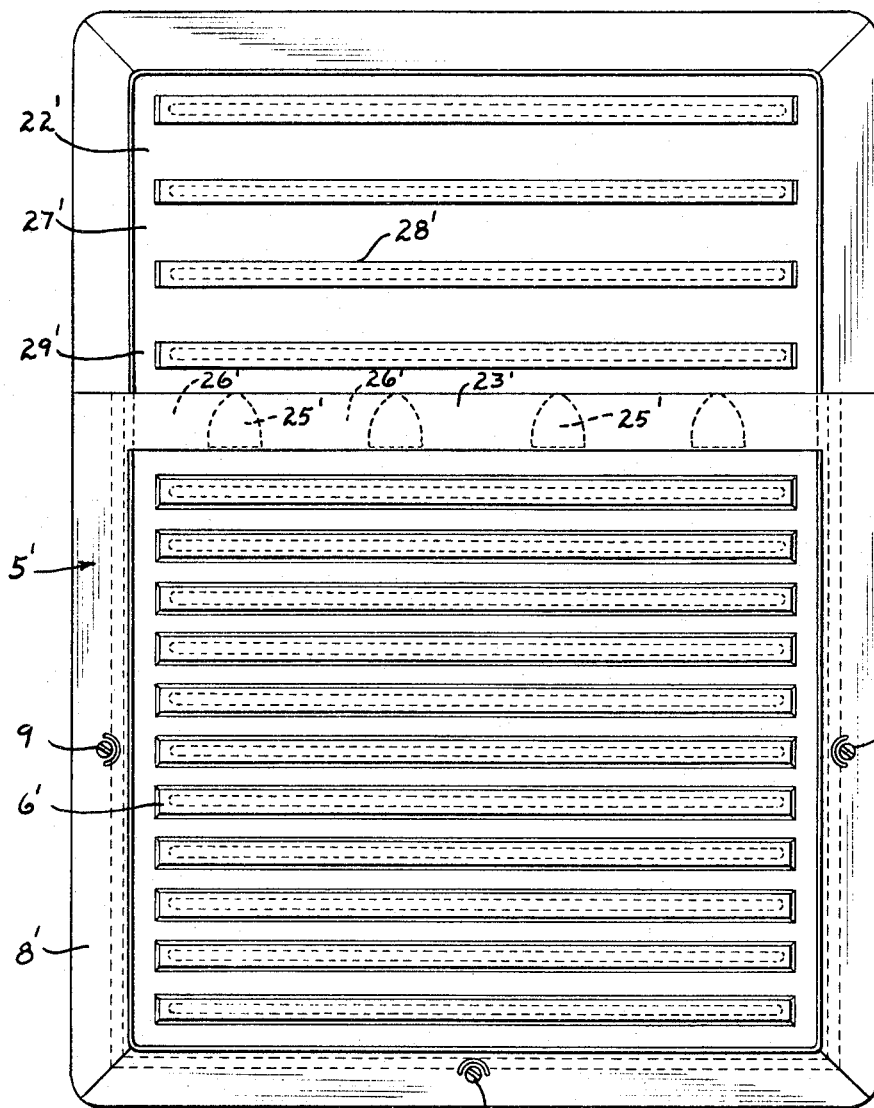
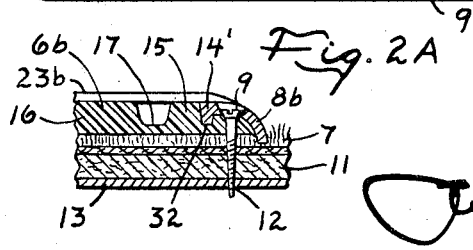
Inventor
Stanley S. Stata
Andrew F. Wintercorn
Attorney 3,387,315
SHOE SCRAPER FLOOR GRATINGS
FOR AUTOMOBILE FLOORS
Stanley S. Stata, 301 Longwood St.,
Rockford, Ill. 61108
Filed Sept. 15, 1966, Ser. No. 579,623
12 Claims. (Cl. 15—215)

ABSTRACT OF THE DISCLOSURE

A combined automobile shoe-scraping floor mat and hold-down frame wherein there is provided a toe board extension. The frame has a front cross-over portion overlying the junction of the toe board extension and pan in such a way as to allow free drainage thereunder.

---

This invention relates to shoe scraper floor gratings for application over the carpet on automobile floors.

The principal object of my invention is to provide shoe scraper floor grate pans of durable rubber or plastic material having spaced parallel scraping ribs formed integral with the bottom of a shallow generally rectangular pan with recesses between the ribs deep enough to collect moisture and dirt in the anticipated quantity, the moisture being retained during evaporation thereof while leaving the top surfaces of the ribs fairly dry, the pan having a forwardly and upwardly extending inclined toe-board portion on the front end thereof from which any moisture deposited thereon can drain freely into the main body portion of the pan, the pan being designed to rest on top of the carpet on the automobile floor and to be held in place and secured to the floor by means of a rigid generally rectangular bordering frame suitably secured in place, the frame having its front portion extending across the front end of the pan proper at the junction with the toe-board extension allowing draining of moisture under it or over it from the toe-board into the pan, the toe-board extension on the floor grate unit at the driver's position being fairly narrow so as to leave room to the right of it for the floor pedal or pedals for the brake or the brake and the clutch and also the accelerator pedal, but the toe-board extension on the other floor grate unit at the passenger's position extending the full width of the pan.

The invention is illustrated in the accompanying drawings, in which:

FIG. 1 is a plan view of a floor grate unit for the driver's position made in accordance with my invention with the toe-board extension shown for convenience of illustration as disposed horizontally in coplanar relation to the pan;

FIG. 2 is a cross-section on the line 2—2 of FIG. 1, showing the unit as it appears in use mounted on the floor of an automobile;

FIG. 2A is a sectional detail showing an alternative design of joint between the frame and pan;

FIG. 3 is a longitudinal section on the line 3—3 of FIG. 1, showing the toe-board extension at the usual angle with respect to the pan;

FIG. 3A is a sectional detail showing an alternative design in which the drainage from the toe-board is over instead of under the front portion of the frame into the pan;

FIG. 3B is a section similar to FIG. 2A but showing an alternative design along the lines of FIG. 3A in which the drainage from the toe-board is over instead of under the front portion of the frame into the pan, and FIG. 4 is a plan view similar to FIG. 1 of another floor grate unit like that of FIGS. 1-3 but having a full width toe-board extension, for the passenger's position in the front seat.

Similar reference numerals are applied to corresponding parts throughout the views.

The floor grating units of my invention are indicated generally by the reference numeral 5 and 5' in FIGS. 1 and 4, respectively, each consisting of a generally rectangular pan 6 and 6', respectively, made of rubber or suitable plastic material resting on the carpet 7 and held in place by means of a rigid border frame 8 and 8' respectively, secured by screws 9 entered in holes 10 provided in the frame at suitably spaced intervals, the screws extending through the carpet 7 and the jute sound deadener material 11 therebeneath and threading in holes 12 pierced in the metal floor 13 of the automobile, as indicated in FIG. 2. The frames 8 and 8' have integral vertical flanges 14 that fit inside the upwardly projecting rim portion 15 of the pan 6 or 6', the pans both having spaced parallel scraping ribs 16 formed integral with the bottom of the pan, the ribs being substantially the full depth of the pan and ending short of the sides thereof to leave a deep annular recess 17 all around the pan communicating with the ends of the parallel recesses 18 provided between the ribs 16, whereby to provide adequate capacity for the collection of the anticipated amount of moisture and dirt, the moisture being retained during evaporation thereof while leaving the top surfaces of the ribs 16 fairly dry. The pans 6 and 6' can be easily cleared of dirt at intervals with a vacuum cleaner, so that these floor gratings make for cleanliness in motor vehicles, besides greatly improving the appearance of the car's interior and eliminating the inevitable unsightly condition that results when the carpeting becomes worn at certain spots. Existing cars with worn spots in the carpeting can be fitted with these floor gratings and made to look like new. To conserve in the cost of production and make the units lighter weight, the ribs 16 are preferably all made hollow as indicated at 19. The closely spaced parallel ribs 20 extending transversely of the pan 6 in the right-hand front corner portion serve as a heel rest behind the accelerator pedal, these ribs allowing easy drainage of moisture therefrom into the annular recess 17 at one end and across the front rib and from another recess 21 extending crosswise of their other end.

The toe-board extension 22 is molded integral with the pan 6 and is generally rectangular in form and fairly narrow, extending from the left front corner of the pan under the one end portion 23 of the front cross-portion of the frame 8, the rest of which numbered 24 is of the same cross-sectional form as that shown in FIG. 2, with the flange 14, flange 14 being omitted from the portion 23 as clearly appears in FIG. 3 to allow free drainage of moisture from the toe-board extension into the pan 6 under the portion 23. A single wide boss 25 of generally triangular form, with the apex of the triangle forward, is provided on the pan under the cross-portion 23 of the frame at the middle thereof, leaving clear channels for flow of moisture from the toe-board extension into the pan on opposite sides of this boss. The toe-board extension has a generally rectangular recess 27 provided therein from which project a plurality of foot scraping ribs 28 in widely spaced parallel relation leaving clear channels 29 at both ends for drainage of moisture from the recess 27 through channels 26 into the pan 6. The arrangement is similar in the full width toe-board extension 22′ shown in FIG. 4, where the ribs 28′ have channels 29′ left at their opposite ends for drainage of moisture from the recess 27′ under the cross-portion 23′ extending the full width of the front of the frame 8′. There the bosses 25′, four in number, have five channels 26′ alongside the same through which good drainage can occur from the toe-board extension into the pan 6′. It will be understood, however, that I may omit the bosses 25 and 25′, and, as shown in FIG. 3A, have the cross-portion 23a on the front of the frame 8a resting on the bottom 18a of the pan 6a behind a shoulder 30 provided at the bottom of the toe-board extension 22a, so that the drainage from the recess 27a in the toe-board extension 22a is over the cross-portion 23a, instead of under it, into the pan 6a. This change would apply to both of the front seat units shown in FIGS. 1 and 4. The rear edge of the cross-portion 23a may be bevelled as shown at 31 for better drainage off this cross-portion into the pan.

The frames 8, 8′, and 8a may be die-cast, or stamped from sheet material, and, referring to FIG. 2A, the frames may be made as shown at 8b with a much shorter flange 14′ projecting downwardly from the inner edge thereof to engage in an annular groove 32 provided therefor in the lower height marginal edge portion of the pan 6b, alongside the marginal rim portion 15′ of the pan which defines one side of the annular recess 17 surrounding the shoe scraper ribs 16. This construction uses less metal for the frame 8b and is, therefore, available at lower cost. Also, the frame 8b lies flush with the top of the rim 15′, making for less overall height and a more attractive appearance.

When the frame is as shown at 8b in FIG. 2A the tie portion 23b extends cross-wise of the front end of the frame at the higher level indicated in FIG. 2A to clear the marginal rim portion 15 of the pan, in which the flange 14′ on the frame engages in a groove 32. However, as shown in FIG. 3B, the frame may be as shown at 8c, like the frame 8b, insofar as the flange 14′ engaging in groove 32 is concerned, but if the cross-portion 23b is to have the drainage over it, as in the case of the cross-portion 23a in FIG. 3A, it must extend downwardly alongside the marginal rim portion 15 to connect the cross-portion 23b with the frame 8c.

In operation, it should be understood that while I have disclosed metal frames 8, 8′, 8a, 8b and 8c and that they are fastened by means of screws 9 to the metal floor 13, the screws extending through the carpet 7 and sound deadening material 11 therebeneath, I may provide the frames of less rigid plastic material or hard rubber provided with a thin outwardly extending edge portion through which the frames could be secured to the carpet by sewing. Also, while I have not shown units for application to the floor in front of the back seat, it will suffice to state that such units will be of the same general form as that shown in FIG. 4 with the toe-board extension omitted, the front cross-portion of the frame being the same as the rear cross-portion and anchored to the pan in the same way, and fastened to the floor or carpeting in a similar way.

It is believed the foregoing description conveys a good understanding of the objects and advantages of my invention. The appended claims have been drawn to cover all legitimate modifications and adaptations.

I claim:

1. In a floor grating construction for vehicles, a substantially horizontal floor overlaid with carpeting of compressible material, a generally rectangular shallow pan of flexible material resting on the carpeting having an upwardly projecting rim portion on the marginal edges thereof inside which the moisture and dirt scraped off shoes is retained, shoe scraper grating means provided in said pan, a relatively rigid bordering frame of generally rectangular form engaging the marginal edge portion of said pan to secure it in a desired position on the carpeting, and means for securing said frame against displacement from its selected position, the pan having a toe-board extension integral with the front end portion thereof flexible upwardly at an acute angle with respect to the substantially horizontal plane of said pan, the frame having a front cross-portion overlying the junction of said toe-board extension and pan in such a way as to allow free drainage of moisture past it from the toe-board extension into the pan.

2. In a floor grating construction for vehicles, a substantially horizontal floor overlaid with carpeting of compressible material, a generally rectangular shallow pan of flexible material resting on the carpeting having an upwardly projecting rim portion on the marginal edges thereof inside which the moisture and dirt scraped off shoes is retained, shoe scraper grating means provided in said pan, a relatively rigid frame of generally rectangular form engaging the marginal edge portion of said pan to secure it in a desired position on the carpeting, means for securing said frame against displacement from its selected position, the pan having a toe-board extension integral with the front end portion thereof flexible upwardly at an acute angle with respect to the substantially horizontal plane of said pan, the frame having a front cross-portion overlying the junction of said toe-board extension and pan in such a way as to allow free drainage of moisture past it from the toe-board extension into the pan, a marginal rim portion on said extension, and shoe scraper grating means provided on said toe-board extension within said marginal rim portion thereon.

3. A floor grating construction as set forth in claim 2 wherein the shoe scraper grating means provided on said toe-board extension comprises projections integral with said toe-board extension spaced with respect to one another and said rim on said toe-board extension, whereby to allow free drainage of moisture from said toe-board extension into said pan.

4. A floor grating construction as set forth in claim 1 wherein the front cross-portion of the frame is in elevated relation to the bottom of the pan so as to allow drainage therebeneath of moisture from the pan.

5. A floor grating construction as set forth in claim 1 wherein the front cross-portion of the frame is in elevated relation to the bottom of the pan so as to allow drainage therebeneath of moisture from the pan, there being boss means on the pan abutting the front cross-portion of the frame on the underside for support thereof in spaced relation to the pan while allowing free drainage past the same from the toe-board extension into the pan.

6. A floor grating construction as set forth in claim 1 wherein the front cross-portion of the frame is disposed on the bottom of the pan and below the level of the top of said rim portion, whereby to allow drainage of moisture over it from the toe-board extension into the pan.

7. A floor grating construction as set forth in claim 1 wherein the front cross-portion of the frame is disposed on the bottom of the pan in abutment on its front edge with a shoulder defined at the bottom of the toe-board extension, the cross-portion and shoulder both lying below the level of the top of said rim portion, whereby to allow drainage of moisture over it from the toe-board extension into the pan.

8. A floor grating construction as set forth in claim 1 wherein the bordering frame has an internal downwardly projecting flange provided thereon engaging the rim portion of the pan.

9. A floor grating construction as set forth in claim 1 wherein the bordering frame has an internal downwardly projecting flange provided thereon engaging the rim portion of the pan, said rim portion having an annular groove provided therein into which the flange projects.

10. A floor grating construction as set forth in claim 1 wherein the bordering frame has an internal downwardly projecting flange provided thereon engaging the rim portion of the pan, said rim portion having an annular groove provided therein on a marginal edge portion of reduced thickness in relation to the rest of the rim portion into which the flange projects, the frame being disposed with the top thereof substantially flush with the top of the rim.

11. A floor grating construction as set forth in claim 1 wherein the bordering frame has an internal downwardly projecting flange provided thereon engaging the rim portion of the pan, said flange engaging the inner circumference of said rim portion.

12. A floor grating construction as set forth in claim 1 wherein the shoe scraper grating means provided in said pan are in the form of integral ribs in spaced relation to one another and to the rim portion of said pan, whereby moisture collected in said pan is substantially uniformly distributed to facilitate evaporation thereof.

References Cited

UNITED STATES PATENTS

| | | | |
|---|---|---|---|
| 2,477,960 | 8/1949 | Caldwell | 15—215 |
| 2,892,208 | 6/1959 | Stock | 16—16 |
| 2,897,963 | 8/1959 | Byers. | |
| 3,050,329 | 8/1962 | Pagan | 15—238 X |
| 3,082,032 | 3/1963 | Stata | 15—238 X |
| 3,100,522 | 8/1963 | McIntyre | 15—215 X |

CHARLES A. WILLMUTH, *Primary Examiner.*

LEON G. MACHLIN, *Examiner.*